US008762364B2

(12) United States Patent
Parekh et al.

(10) Patent No.: US 8,762,364 B2
(45) Date of Patent: Jun. 24, 2014

(54) PERSONALIZING SPONSORED SEARCH ADVERTISING LAYOUT USING USER BEHAVIOR HISTORY

(75) Inventors: Rajesh Parekh, Mountain View, CA (US); Jignesh Parmar, Santa Clara, CA (US); Pavel Berkhin, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 496 days.

(21) Appl. No.: 12/050,846

(22) Filed: Mar. 18, 2008

(65) Prior Publication Data

US 2009/0240677 A1   Sep. 24, 2009

(51) Int. Cl.
*G06F 17/30* (2006.01)
(52) U.S. Cl.
USPC ........ 707/707; 707/732; 707/776; 705/14.49; 705/14.73
(58) Field of Classification Search
USPC ............... 707/722, 707, 732, 776; 705/14.49, 705/14.73
See application file for complete search history.

(56) References Cited

U.S. PATENT DOCUMENTS

| | | | | |
|---|---|---|---|---|
| 7,672,937 B2* | 3/2010 | Madhavan et al. | ............ | 707/752 |
| 8,099,496 B2* | 1/2012 | Singh et al. | .................... | 709/225 |
| 8,156,113 B2* | 4/2012 | Aravamudan et al. | ........ | 707/723 |
| 8,601,023 B2* | 12/2013 | Brave et al. | .................... | 707/776 |
| 2001/0049620 A1* | 12/2001 | Blasko | ............................ | 705/10 |
| 2002/0120554 A1* | 8/2002 | Vega | ............................... | 705/37 |
| 2005/0071328 A1 | 3/2005 | Lawrence | | |
| 2005/0172018 A1* | 8/2005 | Devine et al. | .................. | 709/223 |
| 2005/0222989 A1* | 10/2005 | Haveliwala et al. | .......... | 707/707 |
| 2006/0004763 A1* | 1/2006 | Horvitz et al. | ................. | 707/707 |
| 2006/0047643 A1* | 3/2006 | Chaman | .......................... | 707/707 |
| 2007/0060114 A1* | 3/2007 | Ramer et al. | .................... | 455/418 |
| 2007/0294615 A1 | 12/2007 | Sathe | | |
| 2008/0046840 A1* | 2/2008 | Melton et al. | .................. | 715/825 |
| 2008/0133344 A1* | 6/2008 | Hyder et al. | ..................... | 705/14 |
| 2008/0214148 A1* | 9/2008 | Ramer et al. | ................. | 455/414.1 |
| 2008/0221987 A1* | 9/2008 | Sundaresan et al. | ............ | 705/14 |
| 2009/0077579 A1* | 3/2009 | Li et al. | ............................ | 725/34 |
| 2009/0198507 A1* | 8/2009 | Rhodus | ............................. | 705/1 |
| 2010/0182631 A1* | 7/2010 | King et al. | .................... | 358/1.15 |
| 2010/0332583 A1* | 12/2010 | Szabo | ............................ | 709/202 |
| 2013/0073390 A1* | 3/2013 | Konig et al. | ................ | 705/14.54 |
| 2013/0238429 A1* | 9/2013 | Koran et al. | ................ | 705/14.49 |

OTHER PUBLICATIONS

Irene S.Y. Kwan et al., "An E-Customer Behavior Model with Online Analytical Mining for Internet Marketing Planning," Department of Computer Science, City University of Hong Kong, 2007.*
Suhail Ansari, "Integrating E-Commerce and Data Mining: Architecture and Challenges," IEEE, 2001.*

(Continued)

*Primary Examiner* — Robert Beausoliel, Jr.
*Assistant Examiner* — Alexandria Bromell
(74) *Attorney, Agent, or Firm* — James J. DeCarlo; Greenberg Traurig, LLP

(57) ABSTRACT

Embodiments of the invention relate to methods of presenting personalized search results pages to users, and to search engine systems and servers configured to implement such methods. For example, a method of presenting such a page to a user of a search engine includes steps of computing an engagement index of the user based on the distribution in time of that user's interactions with the search engine then presenting, in response to a query by the user, a personalized search results page to the user.

21 Claims, 5 Drawing Sheets

(56) References Cited

OTHER PUBLICATIONS

Sung Ho Ha, "Helping Online Customers Decide through Web Personalization," IEEE, 2002.*
Sung Min Bae et al., "Fuzzy Web Ad Selector Based on Web Usage Mining," IEEE, 2003.*
Written Opinion of the International Searching Authority for Related Foreign Application PCT/US2009/034905.
International Search Report for Related Foreign Application PCT/US2009/034905.
The extended European search report issued by the European Patent Office on Aug. 8, 2012 for Application No. 09722492.7.

* cited by examiner

PERSONALIZING SPONSORED SEARCH ADVERTISING LAYOUT USING USER BEHAVIOR HISTORY

BACKGROUND OF THE INVENTION

1. Field of the Invention

The present invention relates to personalizing the layout of advertisements that are displayed on the results pages of search engines.

2. Art Background

Balancing monetization and user experience of search result pages (SRPs) is an active area of research in commercial search engines that serve sponsored listings (text based ads and potentially graphical ads) alongside organic (also called algorithmic or native) search results. Several leading commercial search engines typically display sponsored listings on any of three physical locations on the search results page, in conjunction with the organic results. The three locations are labeled as North, East, and South which are situated at the top, right-hand side and bottom (respectively) of the search results page.

Eye-tracking studies have identified geographic regions on search results pages as focal points or "hotspots" for users. These are regions that get more than an ordinate amount of visual attention when a user is initially presented with an HTML page filled with search related content. One of the hotspots is in the top-center of the page, which is where the human eyeball tends to focus on before processing the remainder of the document. This North region is usually the location of an ad banner, and therefore it merits extra attention in terms of what content should be placed at that position.

The North region is typically a major source of revenue for a search engine, primarily due to the extra visual attention that the sponsored listings receive from users, which translates directly into additional mouse clicks on these advertisements. Most search marketing business models are based on CPC (cost-per-click), so the mouse clicks translate directly into revenue.

However, the North region can also be a major contributor to a negative user experience. The higher the number of north sponsored listings, the more negative the user experience is likely to be especially if the ads are deemed irrelevant by the user. The negative user experience can be measured by explicitly by surveying users to gauge their satisfaction or implicitly using query abandonment rates, time-to-first-click, user return rate, as well as several other proxy metrics.

Current methods for determining advertising layout, the number of listings in each viable location, use query-based features, such as the words in the query, the number of advertisers bidding on the query, the quality of matching between the query text and advertisement description, etc. While query-based approaches solve the basic problem, they do not take into account the user who has issued the query.

SUMMARY OF THE INVENTION

In one aspect, embodiments of the invention relate to methods of presenting personalized search results pages to users. For example, a method of presenting such a page to a user of a search engine comprises the following steps. First, computing an engagement index of the user based on the distribution in time of that user's interactions with the search engine. Then, presenting, in response to a query by the user, a personalized search results page to the user if the engagement index of the user meets a threshold.

In another aspect, embodiments relate to search engine systems. For example, a system configured to present a personalized search results page to a user of the search engine comprises a web search client and a web search server. The web search client is implemented in a computer-readable medium configured to receive a query from the user and pass the query to the web search server. The web search server is implemented in a computer-readable medium configured to compute an engagement index of the user based on the distribution in time of that user's known interactions with the search engine and to generate, in response to the query, a search results page and pass it to the web search client for display, wherein the search results page is personalized if the engagement index of the user meets a threshold.

In another aspect, embodiments of the invention relate to web search servers. For example, a web search server embodied in a computer-readable medium and configured to personalize layout of a web search results page of a search engine comprises a personalization module. The personalization module is configured to receive user behavior data concerning a user's interactions with a search engine and to determine an engagement index for the user based on some of the user behavior data. The module is further configured to generate, in response to a query by the user, a search results page with an advertising layout. Wherein the advertising layout is one of the following: 1) based on the user behavior data when the engagement index for the user meets an engagement threshold; and 2) not based on the user behavior data when the engagement index for the user does not meet the engagement threshold.

In another aspect, some embodiments of the invention relate to computer-implemented methods of personalizing layout of ads that appear on the search results page. For example, a method of personalizing the ad layout of a results page of a search engine comprises the following steps: collecting user behavior data concerning a user's interactions with a search engine, determining an engagement index for the user based on some of the user behavior data, and presenting to the user, in response to a query by the user, a search results page with an advertising layout. Wherein the advertising layout is one of the following: 1) based on the user behavior data when the engagement index for the user meets an engagement threshold; and 2) not based on the user behavior data when the engagement index for the user does not meet the engagement threshold. Preferably user behavior data comprises data relating to user actions on the search engine or on other web properties that are controlled by the search engine provider.

In yet another aspect a computer-implemented method of personalizing the ad layout of a web search results page of a search engine employs user interest data. For example, a method comprises the following steps: collecting user interest data; determining an engagement index for the user; and presenting to the user, in response to a query by the user, a search results page with an advertising layout. Wherein the advertising layout is one of the following: 1) based on the user interest data when the engagement index for the user meets an engagement threshold; and 2) not based on the user interest data when the engagement index for the user does not meet the engagement threshold. Preferably user interest data comprises data relating to user interests gained from: 1) explicit sources such as surveys or account-registration forms, or 2) implicit sources such as allocation of time between various web properties.

In still another aspect, a computer-implemented method of personalizing layout of a web search results page of a search engine employs user attribute data. For example a method comprises the following steps: collecting user attribute data; determining an engagement index for the user; and presenting to the user, in response to a query by the user, a search results page with an advertising layout. Wherein the advertising layout is one of the following: 1) based on the user attribute data when the engagement index for the user meets an engagement threshold; and 2) not based on the user attribute data when the engagement index for the user does not meet the engagement threshold. Preferably the user attribute data includes one of the following types of data: demographic, and social. Preferably user attribute data comprises data relating to specific demographic, socioeconomic, and geographic attributes of a user gained from: 1) explicit declaration, or 2) inference.

DETAILED DESCRIPTION

Search Engines
User Interface

Figure 1:
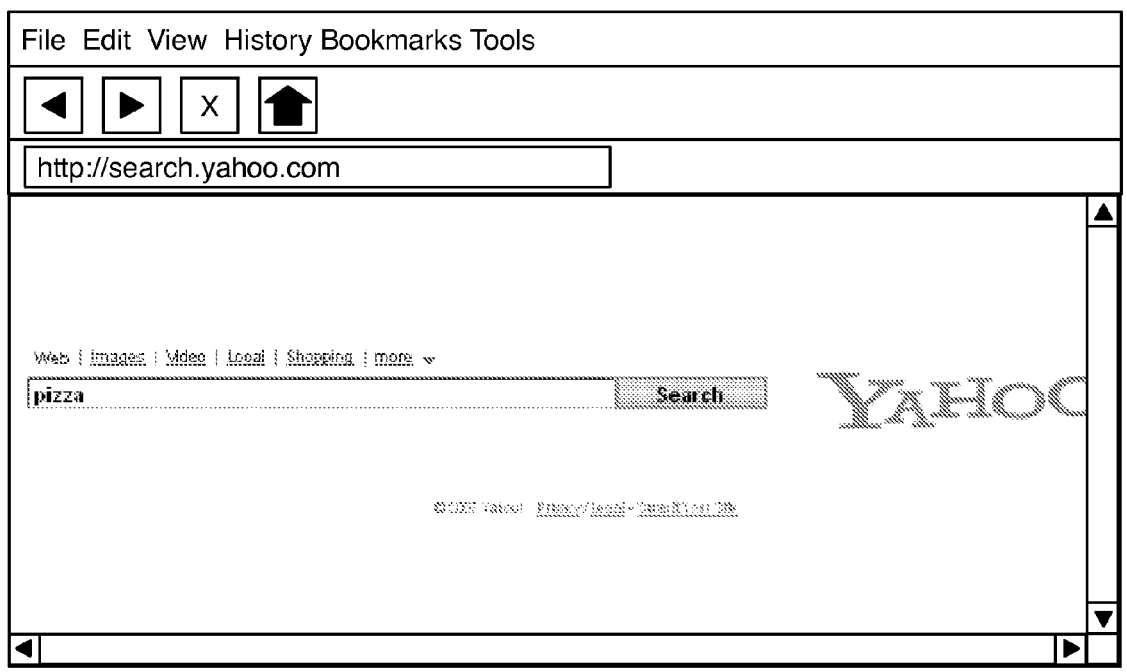
FIG. 1 is an exemplary front page of a typical commercial search engine, which comprises a search text box allowing a user to input a search query.

Users of the Internet are familiar with typical commercial search engines. As shown in FIG. 1, a typical front page of a commercial search engine, the initial point of user interaction with a search engine comprises a text entry box and a query submission button. In FIG. 1 a user has typed "pizza" in the text entry box. The query submission button is labeled "Search".

Figure 2:
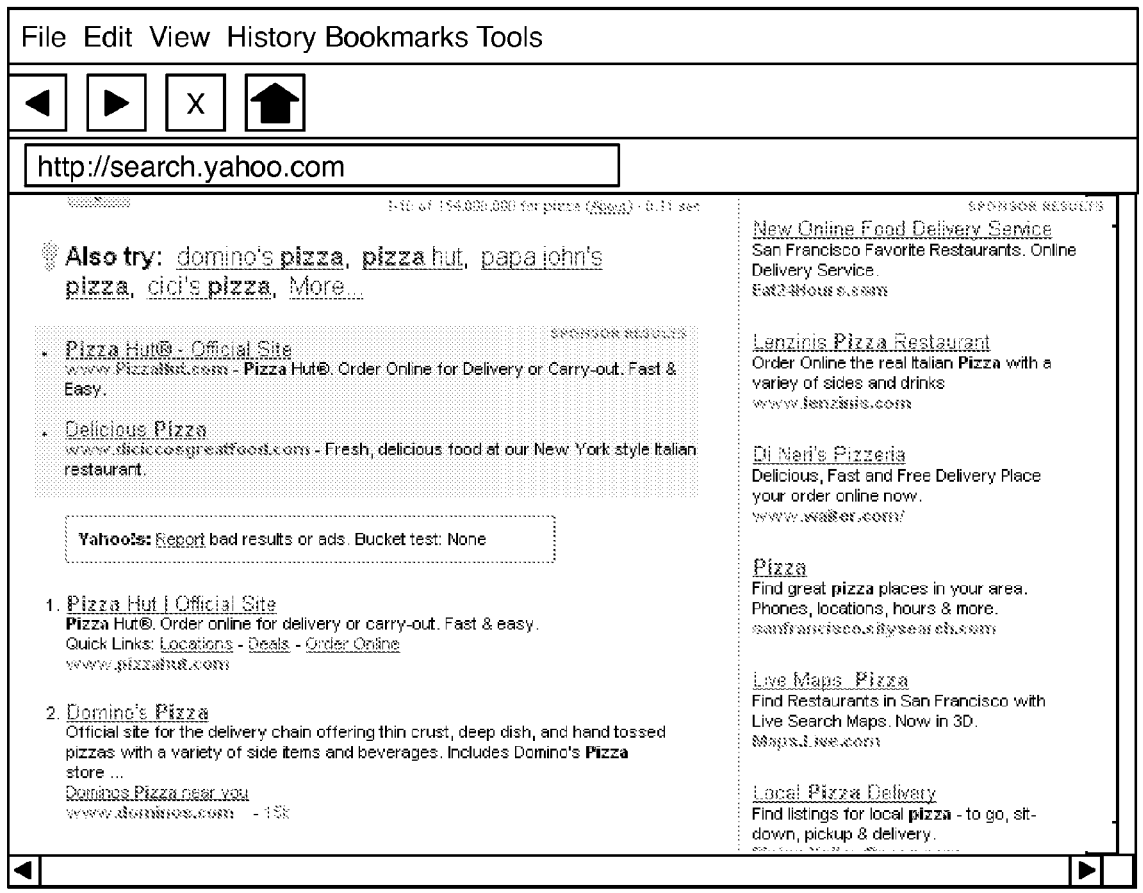
FIG. 2 is an exemplary search results page of a commercial search engine, which comprises algorithmic search results and advertisements in various locations of the page.

FIG. 2 illustrates an exemplary search results page (SRP) returned by a commercial search engine in response to the query "pizza" in FIG. 1. The right column of the page comprises advertisements. The left column of the page comprises advertisements and algorithmic search results.

Figure 3:
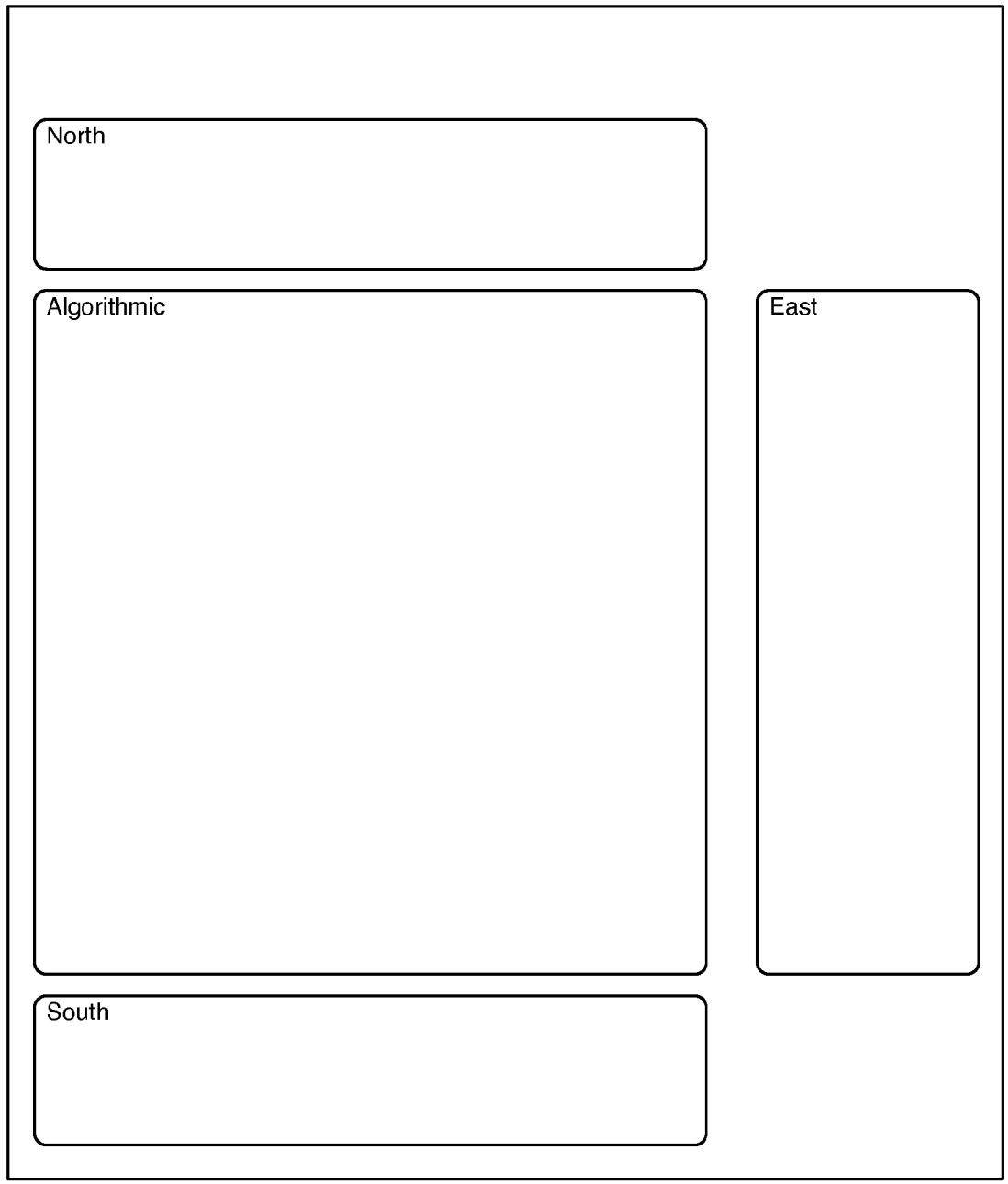
FIG. 3 is a diagram of a search results page broken down into typical algorithmic and advertising regions.
Figure 4:
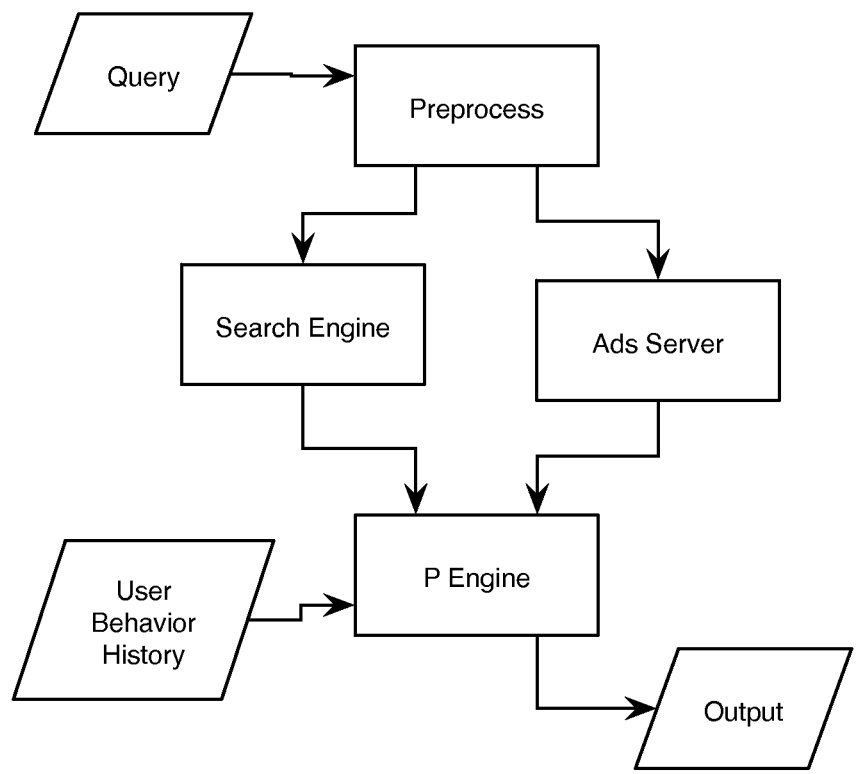
FIG. 4 is a diagram outlining backend processing steps required to produce a search results page including a personalization engine consistent with the present invention.

FIG. 3 illustrates a typical arrangement of a SRP, which is broken into four regions. These regions are arranged into two columns, echoing FIG. 2. The left column contains three regions: the topmost North region, the middle Algorithmic region, and the bottom South region. The right column contains one region, the East region.

In a typical SRP as illustrated by FIGS. 2 and 3, advertisements associated with the search query for which the SRP was returned are displayed in the North, East and South regions, while the results of the query itself are displayed in the Algorithmic region. However, in currently successful commercial search engines, not all SRPs include advertising in each of the North, South, and East regions. Typically when advertisements are not shown in the North region, the Algorithmic region subsumes the area of the North region. However, when advertisements are not shown in the East region, that region is typically left blank.

Backend

FIG. 3 shows a typical search engine workflow by which an SRP is generated in response to a search query. The query is first pre-processed; typical preprocessing operations include filtering, sanitization, stemming, stop-word removal, and canonical format conversion. The pre-processed query is provided to two separate sub-process pipelines. The first pipeline ranks all web content, which is usually referenced by a URL or URI on the World-Wide-Web, in order of relevance to the pre-processed query. This ranking forms the algorithmic search results set for query. The second pipeline ranks all available ads, either text-based or graphical, also in order of relevance to the pre-processed query. The SRP delivered in response to the query draws on both rankings: of ads and of algorithmic results. Typically, SRP construction involves merging the two rankings and includes a default sub-process to determine the layout of the ads on the page. Typically the rankings determine placement of ads within the layout. Though such advertising layout algorithms may formulate advertisement placement in different ways, they use query and individual ad-level features to determine placement. Thus, every user that issues an identical query is presented with an identical SRP layout.

Personalization

Search engine users span a broad spectrum of clicking behavior, ranging from savvy info seekers who are mostly interested in the algorithmic results and rarely click on paid advertisements to heavy internet shoppers who are much more interested in sponsored listings. It is advantageous to reflect this variety of users in generating SRPs.

Consistent with this goal, the backend depicted in FIG. 3 includes a personalization engine consistent with the present invention. As illustrated, the personalization engine receives data on historic user behavior. The personalization engine uses the user behavior data to improve the SRP advertising layout for each query issued by the user.

User Identification

Embodiments of the present invention consider a variety of schemes for user identification. In some embodiments, the user is identified via a browser-based cookie supplied by a search engine. In some embodiments the user is identified via a cookie associated with the user's account with the search engine provider. In some embodiments the user is identified via a cookie associated with another property controlled by the search engine provider.

Engagement

Embodiments of the present invention include methods for gauging the level of engagement of a particular user with the search engine given that user's (known) past behavior. Such methods are advantageous due to the transient nature of browser cookie and the often relatively short life of a cookie in browser memory and disk. Thus embodiments calculate an engagement index that is used calculating a level of confidence in predicted user behavior based on historical user data.

Various embodiments of the invention use a variety of metrics to calculate engagement indices. Preferably the engagement index is based on the distribution in time of users interactions with the search engine. Most preferably the engagement index is formed of at least the following statistics: the frequency of the user visits to the search engine website; the recency of the user visits, e.g. when the user was last observed to visit the website; the intensity of the users activity on the search engine website. The above statistics may be measured in any appropriate units, depending on the functional form of the engagement index calculation, however preferably the frequency is measured in unique day, the recency is measured in days and the intensity is measured in page views. Other statistics than the above are considered. For example, a statistic that represents the distribution of user visits in time may be substituted for the frequency and recency statistics.

A formulation of the engagement index (EI) used in some embodiments is as follows: EI=frequency*intensity/recency. In alternative embodiments, variations of the EI formula include one or more of the intensity, frequency and recency variables described above combined with knowledge of the user's behavior gleaned from other sources. For example engagement on various non-search properties controlled by the search engine provider, e.g. finance, autos, sports.

Preferably, a high EI score indicates (a) high probability of returning to the website in the future, (b) high level of future activity on the website or (c) high level of confidence in the calculations for predicting probability of clicking on ads. Conversely, a low EI score preferably indicates a) low probability of returning to the web site or b) low level of future activity on the web site or c) low level of confidence in calculations for predicting probability of clicking on ads.

In some embodiments the EI is used to determine subsets of users for whom personalization can be effectively performed. Preferably the EI is computed for all users, and users whose EI is above a threshold are deemed sufficiently engaged with the website to perform personalization.

In some embodiments of the invention, if a user is identified as a non-candidate for personalization, the personalization engine does nothing and simply publishes the search results page to the user that the user would have seen without the personalization engine in the pipeline.

Personalizing the SRP Advertising Layout
Personalization Operations

The personalization engine performs personalization operations for users deemed candidates for personalization. There are a wide variety of possible personalization operations. For example, in some embodiments personalization of the layout comprises maintaining a number of ads on the page while increasing the number of ads shown in one of the advertising regions (e.g. North, South, or East) and decreasing the number of ads shown in another advertising region. In some embodiments personalization comprises increasing the number of ads on the page while increasing the number of ads shown in one advertising region and decreasing the number of ads shown in another advertising region. In some embodiments personalization comprises decreasing the number of ads shown on the page while increasing the number of ads shown in one advertising region and decreasing the number shown in another advertising region.

Preferably personalization operations focus on the North advertising region, which is often considered the most valuable advertising area on the SRP. For example, some embodiments focusing on the North region maintain a number of ads on the SRP while decreasing the number of ads shown in the North region, while some increase the number of ads shown in the North region. Embodiments increasing the number of ads shown on the page might similarly increase or decrease the number of ads shown in the North region. Further embodiments decreasing the number of ads shown on the page might also increase or decrease the number of ads shown in the North region. Of course, personalization operations focusing on other regions are also contemplated.

Personalization Workflow

Figure 5:
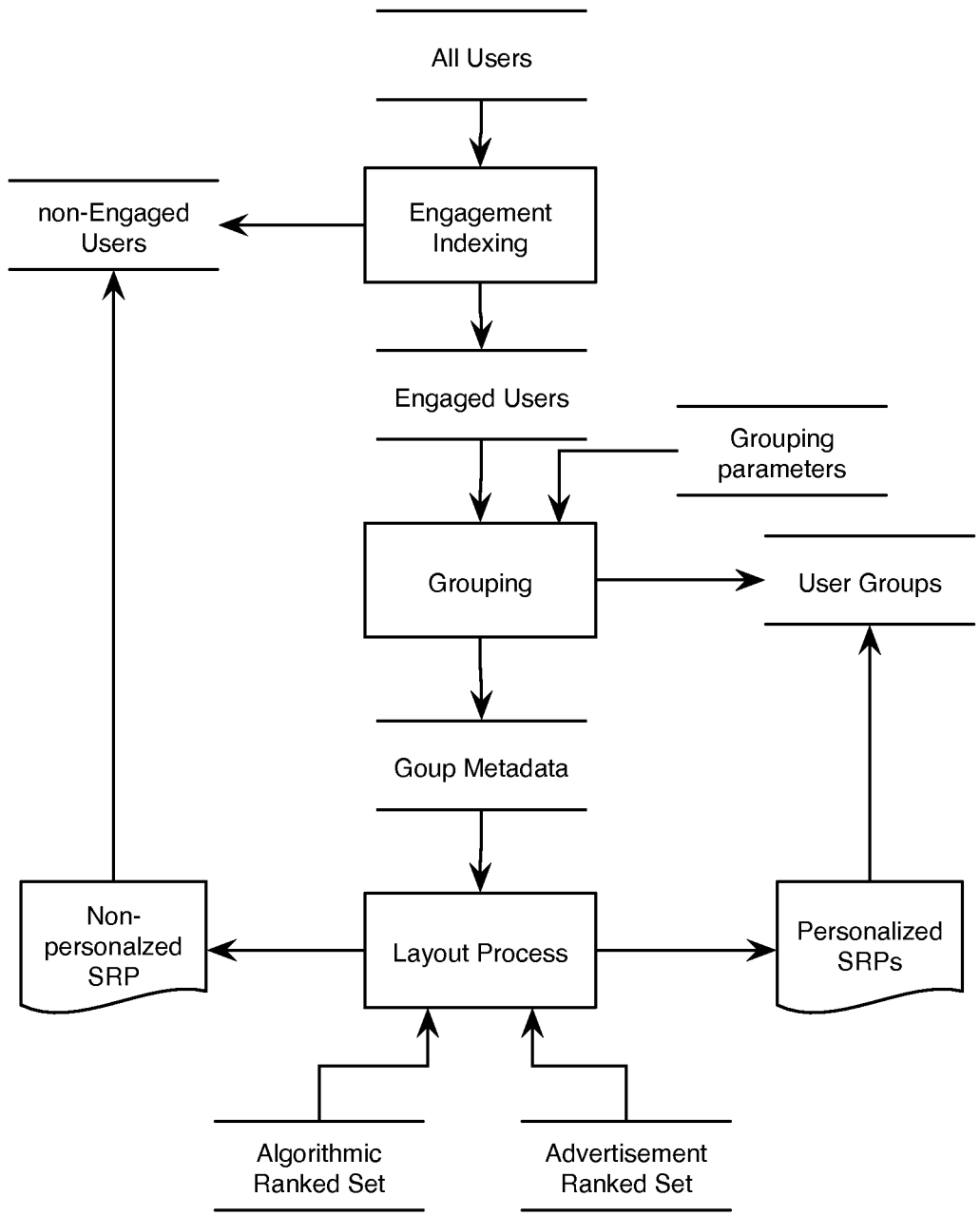
FIG. 5 is a diagram outlining processing steps taken within a personalization engine consistent with the present invention.

FIG. 5 illustrates a personalization workflow consistent with some embodiments. First, an engagement index (EI) is calculated for all users. The users are then partitioned based on EI into engaged and non-engaged users. Then, the engaged users are grouped into User Groups based on a set of Grouping Parameters. Then, the Groups, along with Group Metadata describing the Groups and Grouping Parameters, are supplied to a Layout Process. The Layout Process also receives an Advertisement Ranked Set and an Algorithmic Ranked Set, and then constructs an SRP for each Group. The advertising layout on each SRP is based on the Group Metadata. The ads and results in each layout comprise algorithmic results drawn from the two ranked sets.

It should be noted that the personalized SRPs generated for some groups may be equivalent to the non-personalized SRP generated for the non-engaged user. Personalization
Personalization Goals The question of how to define success within the personalization methods consistent with embodiments of the present invention is a difficult one. Not all embodiments need address this question. However, preferably embodiments of the present invention include either implicit or explicit measures of success. For example, some embodiments include features that attempt to optimize revenue generated. Another, more slippery, metric is user experience. Some embodiments attempt to improve user experience by reducing the area devoted to advertising in the absence of some expected revenue gains.

Personalizing for Groups of Users

In some embodiments, personalization of advertising layout is performed for groups of users based on their aggregate user behaviors. The candidate users are as categorized as 'heavy', 'light' or 'average' clickers by examining the historical click-through rates (CTR) on sponsored ad listings. The click-through rate of the user is the expected number of clicks the user will issue on a sponsored listing, independent of the actual search query and independent of the nature of the sponsored listing. One formulation of CTR is shown below. In the below formulation variables are preferably aggregated for a sufficiently length of time (usually weeks):

$$\text{User } CTR = (\text{num of clicks})/(\text{number of searches where at least 1 ad was shown})$$

For users identified as 'average' clickers, no advertising layout change is made. Further, all non-candidates for personalization (i.e., users with EI scores below the specified threshold) are also effectively treated as 'average' clickers and no advertising layout change is made for them.

For the heavy and light clickers, the advertising layout is preferably altered as described below. For users identified as heavy clickers, the advertising layout is modified so that a different number of advertisements can be shown in the North region (or other prime location) for a subset of queries. If the advertising layout algorithm determines that N advertisements should be shown in the North (or other prime location), and if the personalization engine estimates the expected revenue (for this user) of moving additional advertisements to the north is above a certain threshold, it modifies the layout so that N+α ads are displayed in the north, where α is a positive integer. Preferably the additional α ads are the most valuable, in terms of expected revenue, that would otherwise be shown in the East (or other less prime locations). If the advertising layout algorithm has already determined that a maximum allowed number of advertisements will be shown in the North (or other prime location), then the personalization engine will do nothing.

For users identified as light clickers, the advertising layout is modified so that a different number of advertisements can be shown in the North region (or other prime location) for a subset of queries. If the advertising layout algorithm determines that N advertisements should be shown in the North (or other prime location), and if the personalization engine estimates the expected revenue impact (for this user) of moving additional advertisements out of the North is below a certain threshold,, the personalization engine alters the advertising layout so that N-β ads are displayed in the North, where β is a positive integer. The β ads not shown in the North are either redirected into a less prime ad location or removed from the display. If the advertising layout algorithm has already determined that zero ads will be shown in the North (or other prime location), then the personalization engine will do nothing.

For the methods described above, the thresholds for moving an advertisement into the North (or other prime location) are preferably determined by the business constraints, which dictate the area devoted to advertising for any website property. The computation of the user-independent expected revenue of a query-ad pair can typically be factorized into following equation:

Expected (Revenue|Query, Ad)=Cost (Ad)*Probability (click on Ad|Query, Ad)

The problem of estimating the probability of clicking on an advertisement given a query-advertisement pair is not described in this invention, as there are several ways of accomplishing it. The cost of an advertisement is a known value that is typically agreed upon by the search engine and the advertiser.

In the present embodiment of the invention, the personalization engine refines the expected revenue estimates for a query-advertisement pair by adjusting the Probability (click on Ad|Query, Ad) term in the equation above. This refinement can be made in several ways. Below are some exemplary ways to reflect the change in the expected revenue calculation by modifying the term for the user's probability of clicking on an ad.

One way to reflect the altered probability is by adding a predetermined real value γ. For example, Expected (Revenue|Query, Ad)=Cost (Ad)*(γ+Probability(click on Ad|Query, Ad))

Another way to reflect the altered probability is by multiplying by a suitably computed mathematical function of historical CTR of the user and the average CTR of all users. One such function is: δ*(historical CTR of user)/(average CTR all users), where δ is a predetermined constant. Various other modifications and alterations of this function that maintain the spirit of the formulation are also consistent with the present invention.

$$\text{Expected(Revenue} | \text{Query, } Ad) = \frac{\text{Cost}(Ad) * \text{Probability(click}(Ad) | \text{Query, } Ad) * \delta * (\text{historical } CTR \text{ of user})}{\text{Average } CTR \text{ all users}}$$

Yet another set of ways includes developing a Machine Learned model (using regression, classification or clustering) to predict a probability of clicking, using the historical user CTR rate, as well as the user-independent probability of clicking, preferably derived from query and ad-level features.

The modified values of probability of clicking on an ad (and therefore expected revenue) can be used to set the thresholds outlined in methods described above.

Personalizing per User

In some embodiments of this invention, the users targeted for personalization, e.g. as determined by the Engagement Index, are not classified into groups, e.g. as "average", "light" or "heavy" clickers. Rather the probability of clicking on an advertisement, e.g. as computed via query and ad level features and adjusted by the personalization engine as described above, and therefore the expected revenue is used directly to determine the advertisements shown in the prime locations. For example, the prime advertising spots are given a "pricing", and advertisements are placed in that location only if the expected revenue is above a certain minimum. Preferably pricing thresholds are computed so that business target footprints for an advertising location can be met precisely. One example of such footprint is a rule that at most y % of search results pages will have x ads in the North region.

Additional Details and Enhancements

In some embodiments of the invention, personalization engines can perform additional personalization operations in addition to previously described methods. Further, some embodiments of the invention involve additional implementation details.

Enhancements

For example, some embodiments decrease the total number of advertisements shown on the page if the user has a low probability of clicking on sponsored listings. The advertisement-depth for the entire page can be reduced so that the least valuable advertisements, typically the lowest links on the less visible adverting locations, are not displayed on the search results page. The number of advertisements shown (or filtered) can be determined by using thresholds on the personalized probability of clicking on the advertisements. Alternately, if a user has a high probability of clicking on advertisements, the number of advertisements shown on the page can be increased, provided that there is sufficient advertising inventory and sufficient value, e.g. expected revenue.

Some embodiments modify the advertising layout based on expected probability of clicks on a query given the query's category. For example, some users show different propensities, e.g. historical click-through rates, for advertisements in various categories of a taxonomy, e.g. sports, movies, autos. If such a user issues a query that is identified as belonging to specific node on the taxonomy, then the probability of clicking on the advertisements can be adjusted more precisely by using the category level click-through rates. The manner in which the advertising layout is modified can be exactly as outlined in methods above.

In such category-based methods, a user's interest level in a particular category of advertisements does not need to be limited to the user's historical behavior on the search engine pages. This can be inferred from the user's behavior on other properties of the network, for example, financial, auto, or other verticals. If a user has a high level of interest in certain categories of websites by time spent on a category website inferred by either advertisement click-through rates on those sites or, this can be used to update the estimated click probability on search advertisements. For example, if a user spends more than an average amount of time browsing real estate web pages, they are more likely to click on sponsored search advertisements pertaining to home mortgages. This change in click probability can also be quantified by observing historical user behavior.

Further, some embodiments infer the user's interest level, in terms of probability of clicking on a sponsored search advertisement, specific categories indirectly. For example, if a user shows a high level of interest in autos, they are also likely to be interested in loans. If they purchase a desktop computer, they may also be interested in advertisements for monitors.

In addition, some embodiments infer a user's probability of clicking on various types of advertisements from their demographics. Age, gender and other metrics can be used to infer how likely a user is to click on certain category of advertisements. For example, teenagers will be more likely to click on sponsored search ads for music related products, or males may be more likely than females to click on advertisements for hair growth products. When user accounts have associated demographic information, such methods are possible. Such methods can be combined with the enhancements outlined above.

Some embodiments also use social networks and a user's membership to certain communities to infer the probability of clicking on various types of advertisements. A user's level of membership to a social network can be measured in several ways, as well as the probability of following purchase patterns identified within the social network. For example, if several members of a network purchase concert tickets, the remaining members of the network are quantifiably more likely to purchase concert tickets than a random internet user. In some embodiments such measurements are also be used to adjust the probability that a user will click on certain types of advertisements.

In addition, some embodiments modify advertising layout based on the user's geo-location. Geo-location based targeting is often used to target users with local advertisements. Users might have differing probabilities of clicking on local versus national level advertisements, which can be measured and used to update the estimated click probability on search advertisements.

Additional Details

In some embodiments an engagement index is additionally based user interest data inferred from the distribution of the users interactions with non-search properties. Preferably the non-search properties include one of the following: autos, finance, and sports.

In some embodiments the advertising layout based on the user behavior data is expected to generate additional revenue relative to the advertising layout not based on the user behavior data. In some embodiments the advertising layout based on the user behavior data improves user experience by decreasing the number of ads shown in a region of the search results page relative to the advertising layout not based on the user behavior data. Most preferably, embodiments of the present invention increase average revenue and improve average user experience across all users simultaneously by providing advertising layouts to users based on their user behavior patterns.

In some embodiments the aspect of the advertising layout that is modified is the number of ads shown in each of the of the possible ad locations on the search results page. In some embodiments the aspect of the advertising layout that is modified is the number of ads shown in a primary advertising location of the search results page. Preferably the primary advertising location is the north advertising section of the search results page.

In some embodiments the user behavior data comprises a number of pages returned to the user's browser and a number of clicks the user has performed on sponsored listings, in combination with the content and location of the sponsored listings.

In some embodiments if the engagement index for the user meets the engagement threshold the user is classified based on user behavior data as one of the following: heavy clicker, average clicker, and light clicker. Preferably users in the same class are presented with the same advertising layout.

In some embodiments the advertising layout presented to a user whose engagement index meets the engagement threshold is based on the user's historical click-through rate (CTR). For example, in some embodiments the historical user click-through rate (CTR) is used as a scaling factor to increase, decrease, or preserve the expected revenue on an advertisement given the query and the user. In addition, in some embodiments the historical user click-through rate (CTR) is used as a factor in modeling the expected revenue on an advertisement given a query and the user along with other factors derived from the query and the matching advertisement.

Some embodiments further comprise collecting user interest data and wherein when the engagement index for the user meets the engagement threshold the advertising layout is based also on user interest data collected.

Some embodiments further comprise collecting user attribute data wherein when the engagement index for the user meets the engagement threshold the advertising layout is based also on user attribute data collected.

In some embodiments the engagement index is based on the distribution in time of the user's past interactions with the search engine. Preferably the engagement index is based on the recency, intensity, and frequency with which the user has visited the search engine.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A method comprising:
computing, by a computer, an engagement index of a user based on a distribution in time of the user's interactions with a search engine, the engagement index comprising at least a measured frequency of the user's visits to the search engine, a measured recency of the user's visits to the search engine, and a measured intensity of the user's activity at the search engine, the measured intensity is associated with a number of search engine page views by the user, wherein the engagement index equals the measured frequency multiplied by the measured intensity and divided by the measured recency; and
presenting, in response to a query by the user, a personalized search results page to the user when the engagement index of the user meets a threshold value, wherein the threshold value indicates that the user is sufficiently engaged with the website to perform personalization and wherein, the personalized search results page for presenting to the user a personalized advertisement layout comprising:
a search related content; and
at least one advertisement.

2. The method of claim 1, where the threshold value is set based on a probability of clicking on an advertisement.

3. The method of claim 2, wherein a probability of clicking on an advertisement is used to determine the at least one presented advertisement.

4. The method of claim 1 where the engagement index is additionally based on user interest data inferred from the distribution of the user's interactions with non-search properties.

5. The method of claim 4, wherein the non-search properties include one of the following: autos, finance, and sports.

6. The method of claim 1, wherein the threshold value is determined by a business constraint.

7. The method of claim 6, wherein the business constraint comprises expected revenue.

8. The method of claim 7, wherein the expected revenue is calculated by:

Expected (Revenue|Query, Ad)=Cost(Ad)*Probability (click on Ad|Query, Ad).

9. An apparatus comprising:
a processor;
a storage medium for tangibly storing thereon program logic for execution by the processor, the program logic comprising:
computing logic executed by the processor for computing an engagement index of a user based on a distribution in time of the user's interactions with a search engine, the engagement index comprising at least a measured frequency of the user's visits to the search engine, a measured recency of the user's visits to the search engine, and a measured intensity of the user's activity at the search engine, the measured intensity is associated with a number of search engine page views by the user, wherein the engagement index equals the measured frequency multiplied by the measured intensity and divided by the measured recency; and
presenting logic executed by the processor for presenting, in response to a query by the user, a personalized search results page to the user when the engagement index of the user meets a threshold value, wherein the threshold value indicates that the user is sufficiently engaged with the website to perform personalization and wherein, the personalized search results page for presenting to the user a personalized advertisement layout comprising:
a search related content; and
at least one advertisement.

10. A non-transitory computer readable storage medium tangibly storing computer program instructions capable of being executed by a computer processor, the computer program instructions defining code for:
computing an engagement index of a user based on a distribution in time of the user's interactions with a search engine, the engagement index comprising at least a measured frequency of the user's visits to the search engine, a measured recency of the user's visits to the search engine, and a measured intensity of the user's activity at the search engine, the measured intensity is associated with a number of search engine page views by the user, wherein the engagement index equals the measured frequency multiplied by the measured intensity and divided by the measured recency; and
presenting, in response to a query by the user, a personalized search results page to the user when the engagement index of the user meets a threshold value, wherein the threshold value indicates that the user is sufficiently engaged with the website to perform personalization and wherein, the personalized search results page for presenting to the user a personalized advertisement layout comprising:
a search related content; and
at least one advertisement.

11. The non-transitory computer readable storage medium of claim 10, where the threshold value is set based on a probability of clicking on an advertisement.

12. The non-transitory computer readable storage medium of claim 11, wherein a probability of clicking on an advertisement is used to determine the at least one presented advertisement.

13. The non-transitory computer readable storage medium of claim 10, where the engagement index is additionally based on user interest data inferred from the distribution of the user's interactions with non-search properties.

14. The non-transitory computer readable storage medium of claim 13, wherein the non-search properties include one of the following: autos, finance, and sports.

15. The computer program product of claim 10, wherein the threshold value is determined by a business constraint.

16. The non-transitory computer readable storage medium of claim 15, wherein the business constraint comprises an expected revenue.

17. The non-transitory computer readable storage medium of claim 16, wherein the expected revenue is calculated by:

Expected (Revenue|Query, Ad)=Cost (Ad)*Probability (click on Ad|Query, Ad).

18. The non-transitory computer readable storage medium of claim 10, wherein the personalized advertisement layout further comprises a plurality of advertisement regions, where the personalized advertisement layout comprises at least one advertisement in a first advertisement region and no advertisements in a second advertisement region.

19. The apparatus of claim 9, wherein the personalized advertisement layout further comprises a plurality of advertisement regions, where the personalized advertisement layout comprises at least one advertisement in a first advertisement region and no advertisements in a second advertisement region.

20. The apparatus of claim 9, where the threshold value is set based on a probability of clicking on an advertisement.

21. The method of claim 1, wherein the personalized advertisement layout further comprises a plurality of advertisement regions, where the personalized advertisement layout comprises at least one advertisement in a first advertisement region and no advertisements in a second advertisement region.

* * * * *